(12) United States Patent
Hsu et al.

(10) Patent No.: US 10,367,371 B2
(45) Date of Patent: Jul. 30, 2019

(54) INTELLIGENT CHARGING SYSTEM AND INTELLIGENT CHARGING METHOD

(71) Applicant: AVer Information Inc., New Taipei (TW)

(72) Inventors: Chi-Fa Hsu, New Taipei (TW);
Chao-Hung Chang, New Taipei (TW);
Lien-Kai Chou, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 36 days.

(21) Appl. No.: 15/646,049

(22) Filed: Jul. 10, 2017

(65) Prior Publication Data
US 2018/0226830 A1   Aug. 9, 2018

(30) Foreign Application Priority Data
Feb. 6, 2017   (TW) .............................. 106103825 A (51) Int. Cl.
*H02J 7/00* (2006.01)
*H02J 7/04* (2006.01)
*H02J 7/02* (2016.01)

(52) U.S. Cl.
CPC .............. *H02J 7/04* (2013.01); *H02J 7/0013* (2013.01); *H02J 7/022* (2013.01); *H02J 7/045* (2013.01)

(58) Field of Classification Search
CPC .. H02J 7/022; H02J 7/04; H02J 7/0013; H02J 7/045
See application file for complete search history.

(56) References Cited

U.S. PATENT DOCUMENTS

| 2014/0312944 A1 | 10/2014 | Bunch et al. | |
| 2016/0095176 A1* | 3/2016 | Chang Hu | H05B 33/0815 315/205 |
| 2016/0095179 A1* | 3/2016 | Jang | H05B 33/083 315/125 |

FOREIGN PATENT DOCUMENTS

| CN | 103004075 A | 3/2013 |
| TW | 200729662 A | 8/2007 |

* cited by examiner

*Primary Examiner* — Vuthe Siek
(74) *Attorney, Agent, or Firm* — CKC & Partners Co., LLC (57) ABSTRACT

An intelligent charging system comprises a first switching element, a phase detecting device, a current detecting device and a controller. The first switching element is turned on or off based on a first control signal. The phase detecting device is configured to determine an allowable phase time interval of a phase of a power source. The current detecting device is connected to the first switching element. The current detecting device is configured to detect a first turned on time point when the first switching element is turned on. The controller is connected to the phase detecting device and the current detecting device. The controller is configured to determine whether the first turned on time point is within the allowable phase time interval. If the first turned on time point is not within the allowable phase time interval, the controller resets a first control parameter of the first control signal.

10 Claims, 5 Drawing Sheets

INTELLIGENT CHARGING SYSTEM AND INTELLIGENT CHARGING METHOD

CROSS-REFERENCE TO RELATED APPLICATION

This application claims the priority benefit of TAIWAN Application serial no. 106103825, filed Feb. 6, 2017, the full disclosure of which is incorporated herein by reference.

FIELD OF INVENTION

The invention relates to an intelligent charging system and an intelligent charging method. More particularly, the invention relates to an intelligent charging system and an intelligent charging method for setting the control parameters.

BACKGROUND

A charging device is generally designed to accommodate several to dozens of digital devices and charge the digital devices. However, charging dozens of digital devices at the same time may cause a power distribution system overload to start the overload protection mechanism, thus resulting in power interruption and causing user disturbance. Therefore, a number of charging areas are provided to ensure that one single charging area supply power source will not cause the power distribution system to be overloaded. Whether the charging area is enabled or disabled to supply power is controlled by the controller collaborating with the power switch. In order to make the charging devices within the charging areas completely charged, the controller keeps switching the power switches based on the charging mechanism. When the power switches are turned on, AC power is supplied to several power supplies at the same time through the power switches, and is converted to DC power to supply power to several digital devices.

In order to stabilize the input power source, input terminals of the power supply are all equipped with large-capacity capacitors, the capacitor will be charged instantly when the power switch is turned on. This instantaneous charging current is inrush current. If the inrush current is too large, a metal contact of the power switch will be melted, and at this point the distribution system will be overload protected and powered off.

The magnitude of the inrush current is related to the phase of the AC voltage corresponding to the moment when the power switch is turned on. If the phase of the AC voltage corresponding to the instantaneous moment when the power switch can be effectively controlled and is turned on, the inrush current of the power switch can be greatly reduced, and the service life of the power switch may be prolonged. In addition, due to the power switch structure design, when the power switch receives the control signal, the contact will not be immediately conducted. Due to the working time of the power switch, time difference may be caused. The time difference may also vary with the aging of the parts caused by the number of switching times.

Therefore, how to ensure that the conduction state always occurs in the time interval in which the smaller inrush current occurs, and how to adjust the working time of the power switch when the power switch varies due to aging or other factors, are the problems needed to be addressed in the art.

SUMMARY

An aspect of this disclosure is to provide an intelligent charging system. The intelligent charging system comprises a first switching element, a phase detecting device, a current detecting device and a controller. The first switching element is turned on or off based on a first control signal. The phase detecting device is configured to determine an allowable phase time interval of a phase of a power source. The current detecting device is connected to the first switching element, wherein the current detecting device is configured to detect a first turned on time point when the first switching element is turned on. The controller is connected to the phase detecting device and the current detecting device, wherein the controller is configured to determine whether the first turned on time point is within the allowable phase time interval, and if the first turned on time point is not within the allowable phase time interval, the controller resets a first control parameter of the first control signal.

Another aspect of this disclosure is to provide an intelligent charging method. The intelligent charging method includes the following operations of: determining an allowable phase time interval of a phase of a power source; sending a first control signal to a first switching element; detecting a first turned on time point when the first switching element is turned on; and determining whether the first turned on time point is within the allowable phase time interval, and if the first turned on time point is not within the allowable phase time interval, resetting a first control parameter of the first control signal.

Therefore, according to the technical concept of the present invention, embodiments of this disclosure are to provide an intelligent charging system and an intelligent charging method, and in particular, an intelligent charging system and an intelligent charging method for setting control parameters, so as to effectively suppress the inrush current generated at the instantaneous moment when the power supply is turned on.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Figure 1A:
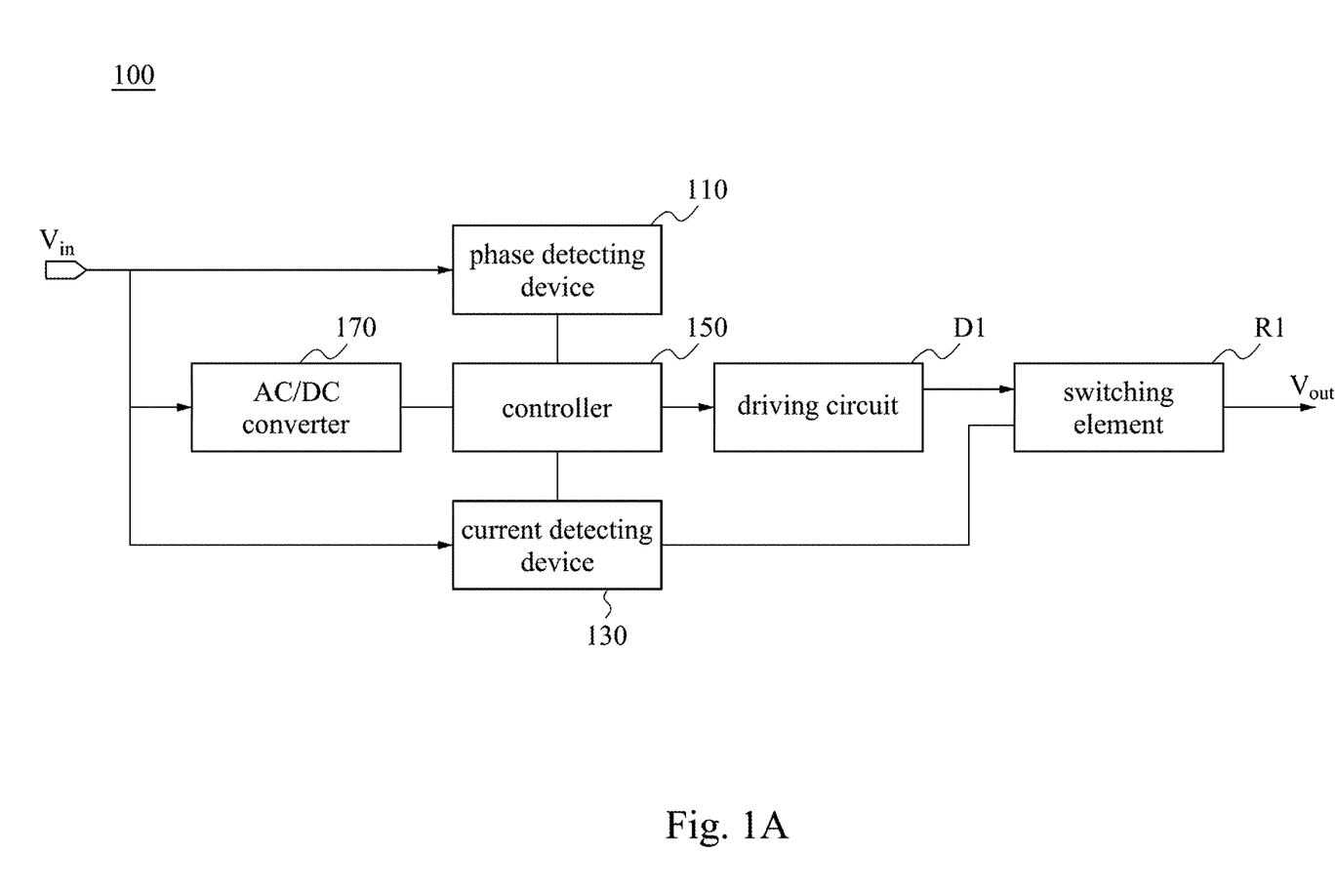
FIG. 1A is a schematic diagram illustrating an intelligent charging system according to some embodiments of the present disclosure.

Reference is made to FIG. 1A. FIG. 1A is a schematic diagram illustrating an intelligent charging system 100 according to some embodiments of the present disclosure. The intelligent charging system 100 includes a phase detecting device 110, a current detecting device 130, a controller 150 and a switching element R1. The switching element R1 is turned on or off based on a control signal transmitted by the controller 150, and the time point at which the control signal is transmitted is set according to the control parameter. The phase detecting device 110 detects and determines the phase of the input power source. The current detecting device 130 is connected to the switching element R1, and the current detecting device 130 detects whether the switching element R1 is turned on. The controller 150 is connected to the current detecting device 130 and the phase detecting device 110. The intelligent charging system 100 illustrated in FIG. 1A is for illustrative purposes only, and embodiments of the present disclosure are not limited thereto.

If the switching element R1 is turned on at a phase of 0° or 180°, the inrush current at this moment is at a minimum value. It is desirable that the phase at which the switching element R1 is turned on may be close to 0° or 180°, or within the allowable phase range near 0° or 180°.

In some embodiments, the phase detecting device 110 determines the allowable phase time interval of the phase of the input power source, and transmits a signal to the controller 150 within the allowable phase time interval. In other embodiments, the phase detecting device 110 determines that the midpoint of the allowable phase time interval of the phase of the input power source is the phase time point, and transmits the signal to the controller 150 at the phase time point. In other embodiments, the phase detecting device 110 transmits a signal to the controller 150 at a phase time point according to the phase time point set beforehand.

For example, the phase detecting device 110 detects whether the allowable phase interval occurs during the process of the power source input according to the allowable phase interval. Furthermore, the phase detecting device 110 determines the allowable phase time interval when the allowable phase interval occurs, and the phase detecting device 110 sends the signal to the controller 150. For example, if the allowable phase interval is set to a range of −30° to 30° and 150° to 210°, when the phase detecting device 110 detects that the phase of the input power source is within a range from −30° to 30° and 150° to 210°, the phase detecting device 110 sends a signal to the controller 150. Values of the allowable phase interval shown above are for illustrative purposes only, and embodiments of the present disclosure are not limited thereto.

In some embodiments, the current detecting device 130 transmits a signal to the controller 150 when the switching element R1 is detected to be turned on.

After the controller 150 receives the signal transmitted from the phase detecting device 110 and the signal transmitted by the current detecting device 130, the controller 150 determines whether the turned on time point at which the switching element R1 is turned on is within the allowable phase time interval. If the controller 150 determines that the turned on time point at which the switching element R1 is turned on is not within the allowable phase time interval, the controller 150 resets the control parameter of the control signal.

In some embodiments, the control parameter includes a correction time. When the controller 150 determines that the turned on time point at which the switching element R1 is turned on is not within the allowable phase time interval, the controller 150 resets the correction time of the control parameter. Furthermore, the controller 150 transmits the control signal to the switching element R1 according to the reset correction time. For example, when the turned on time point at which the switching element R1 is turned on corresponds to the phase of the input power source of 50° and the allowable phase time interval is set to be the time interval when the phase of the input power source is in the range of −30° to 30° and 150° to 210°, the controller 150 determines that the turned on time point at which the switching element R1 is turned on is not within the allowable phase time interval, and then the controller 150 resets the correction time of the control parameter so that the turned on time point at which the switching element R1 is turned on is corrected from the time point of the phase of 50° to the time interval of −30° to 30° and 150° to 210°.

In some embodiments, the intelligent charging system 100 also includes an AC/DC converter 170. In some embodiments, the AC/DC converter 170 is configured to convert alternating current of the input power source into direct current and configured to transmit the direct current to the controller 150 to provide the power required by the controller 150.

In some embodiments, the intelligent charging system 100 also includes a driving circuit D1. The driving circuit D1 is connected to the controller 150 and the switching element R1. When the controller 150 sends a control signal for controlling the switching element R1, the driving circuit D1 receives the control signal sent from the controller 150, and the driving circuit D1 transmits the control signal to the switching element R1 to turn on or off the switching element R1.

Figure 1B:
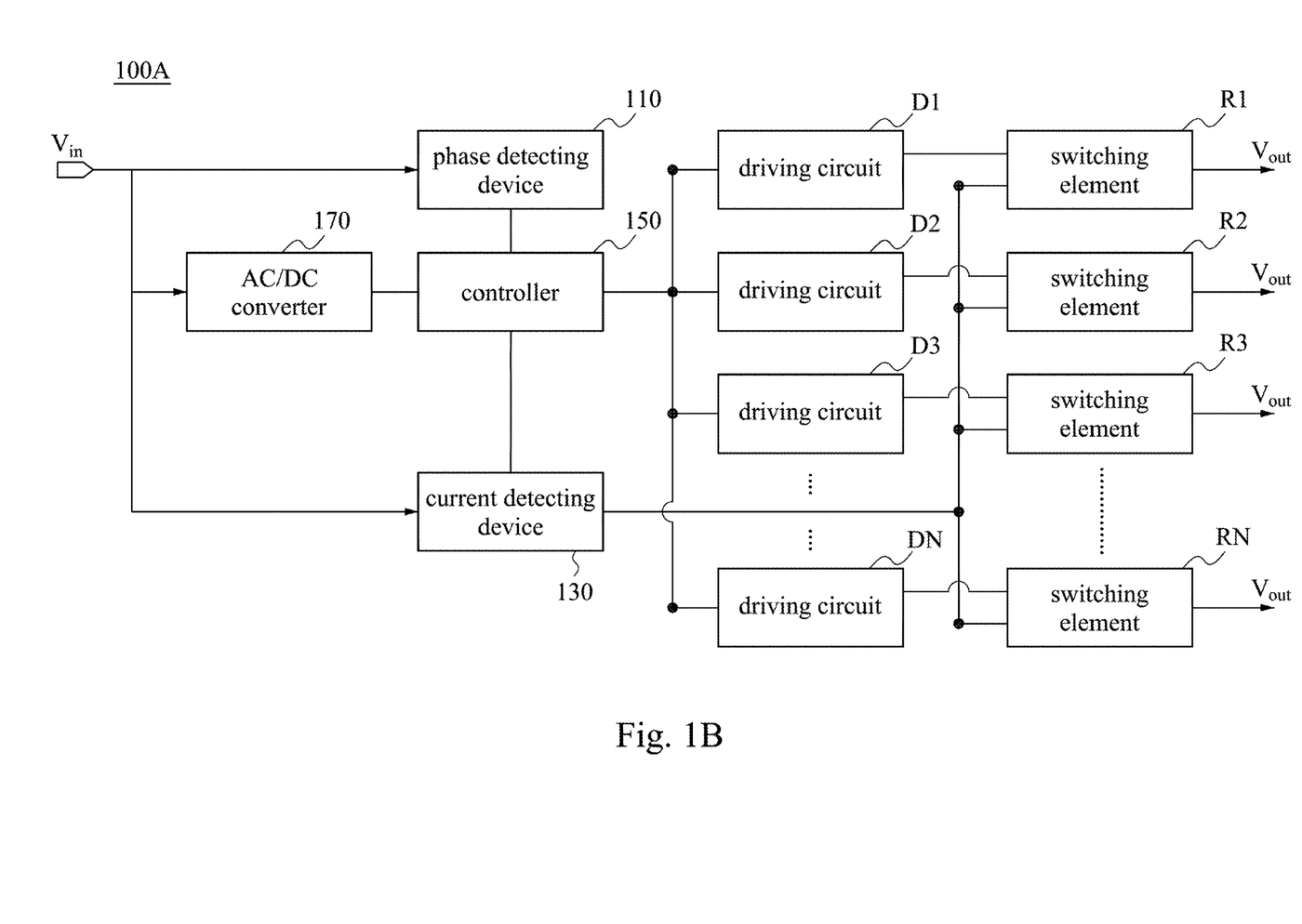
FIG. 1B is a schematic diagram illustrating an intelligent charging system according to some embodiments of the present disclosure.

Reference is made to FIG. 1B. FIG. 1B is a schematic diagram illustrating an intelligent charging system 100A according to some other embodiments of the present disclosure. As shown in FIG. 1B, the intelligent charging system 100A further includes N switching elements R1 to RN and N driving circuits D1 to DN. Each of the switching elements R1 to RN is turned on or off according to the respective control information. The driving circuits D1 to DN are configured to transmit the respective control information to the respective switching elements R1 to RN. Each control information has a control parameter corresponding to one of the switching elements R1 to RN.

Figure 2A:
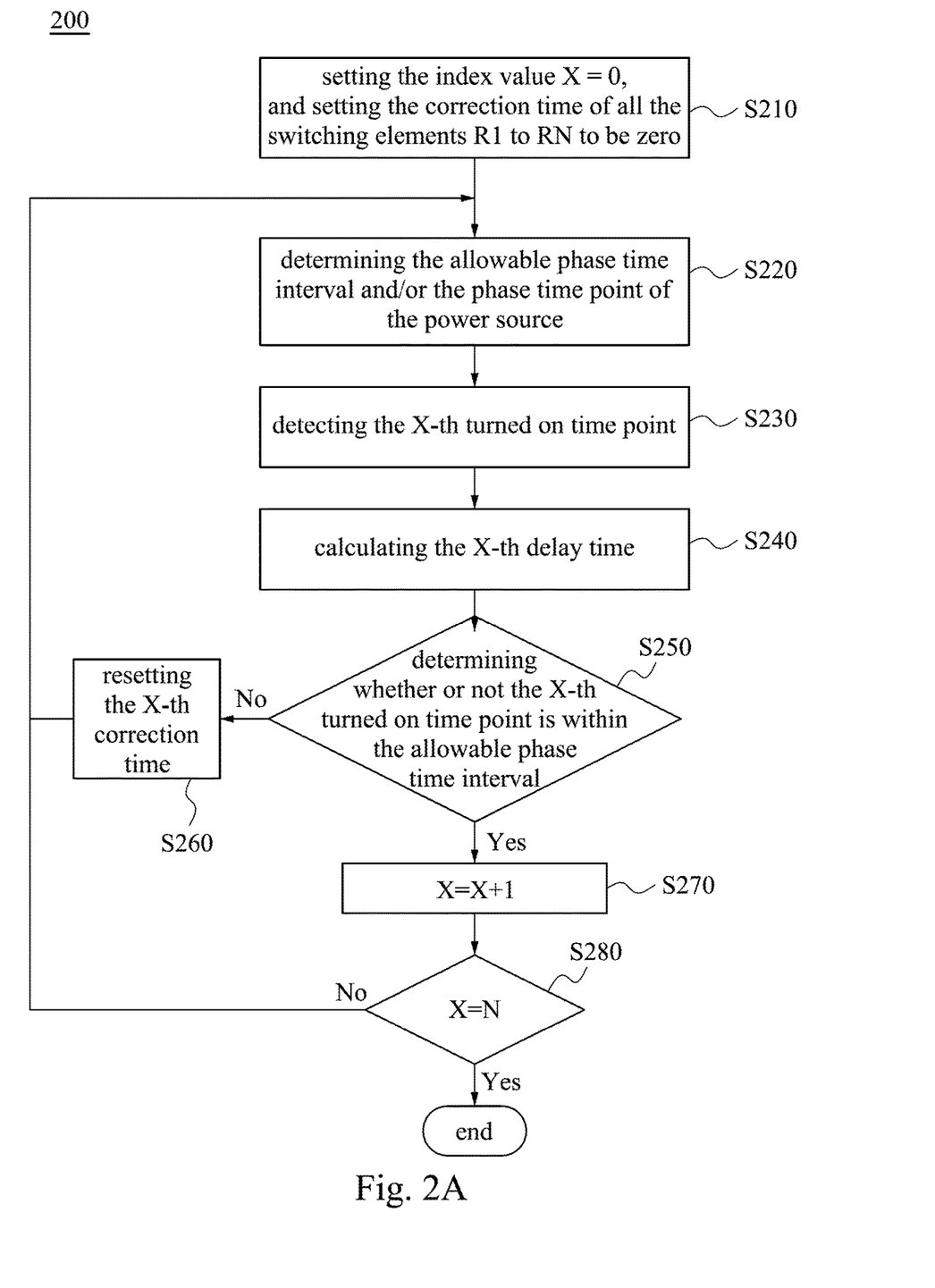
FIG. 2A is a flow chart illustrating an intelligent charging method according to some embodiments of the present disclosure.

Reference is made to FIG. 2A. FIG. 2A is a flow chart illustrating an intelligent charging method 200 according to some embodiments of the present disclosure. The intelligent charging method 200 includes operations S210 to S280.

In order to make the intelligent charging method 200 of this case easy to be understood, reference is made to FIG. 1B and FIG. 2A together. In some embodiments, operation S210 is performed first. In operation S210, the index value X=0 is set, and the correction time of all the switching elements R1 to RN is set to be zero. In some embodiments, operation S210 may be performed by the controller 150.

Next, operation S220 is performed. In operation S220, the allowable phase time interval and/or the phase time point of the power source is determined. For example, if the phase interval is in the range of −30° to 30° and 150° to 210°, when the phase detecting device 110 detects that the phase of the input current is within the allowable phase interval, the phase detecting device 110 determines that the current time point is within the allowable phase time interval, and the phase detecting device 110 sends a signal to the controller 150. In some embodiments, operation S220 is performed by the phase detecting device 110.

Next, operation S230 is performed to detect whether the X-th switching element RX is turned on. When the X-th switching element RX is turned on, the signal is transmitted to the controller 150. In some embodiments, operation S230 is performed by the current detecting device 130.

Figure 2B:
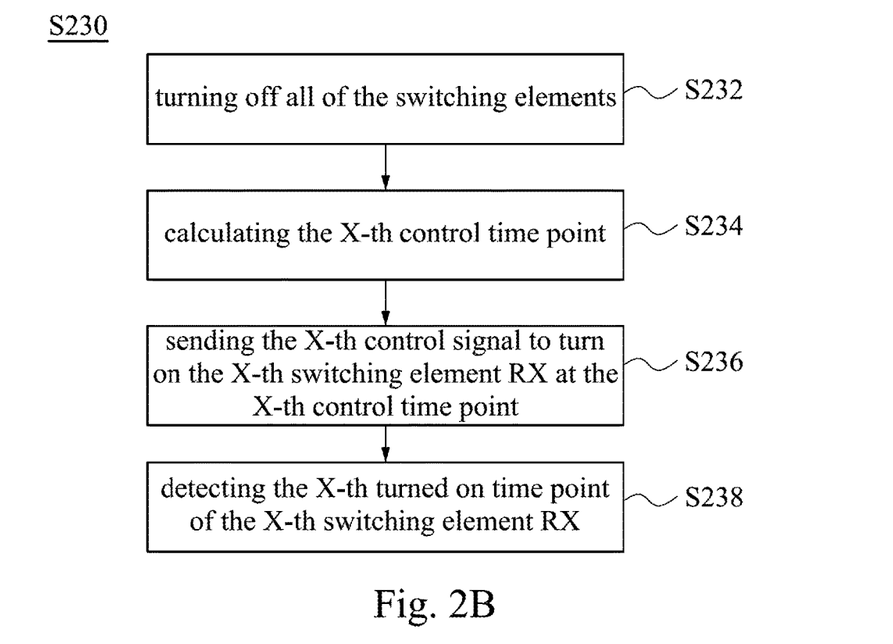
FIG. 2B is a flow chart illustrating one of the operations in the intelligent charging method shown in FIG. 2A according to some embodiments of the present disclosure.

Reference is made to FIG. 2B. FIG. 2B is a flow chart illustrating one of the operations in the method 200 of FIG. 2A according to some embodiments of the present disclosure. As illustrated in FIG. 2B, operation S230 includes operations S232 to S238.

First, operation S232 is performed. In operation S232, a control signal is sent to all of the switching elements R1 to RN to turn off all of the switching elements R1 to RN. In some embodiments, operation S232 is performed by the controller 150.

Next, operation S234 is performed. In operation S234, the X-th control time point of the X-th switching element RX is calculated. In some embodiments, the controller 150 calculates the X-th control time point of the X-th switching element RX according to the phase time point and the X-th correction time of the X-th switching element RX. For example, the X-th control time point of the X-th switching element RX may be calculated according to the following relationship.

$$T\_ON[X]=T\_ZC+T\_ADJ[X] \qquad (1)$$

Wherein T_ON[X] is the X-th control time point, T_ZC is the phase time point, and T_ADJ[X] is the X-th correction time. In some embodiments, operation S234 is performed by the controller 150.

Next, operation S236 is performed. In operation S236, the X-th control signal of the X-th switching element RX is sent at the X-th control time point of the X-th switching element RX to turn on the X-th switching element RX. The X-th control time point of the X-th switching element RX is the time point calculated in operation S234. In some embodiments, operation S236 is performed by the controller 150.

Next, operation S238 is performed to detect whether the X-th switching element RX is turned on and a signal is transmitted to the controller 150. The detected time point at which the X-th switching element RX is turned on is the X-th turned on time point. In some embodiments, operation S238 is performed by the current detecting device 130.

Reference is made to FIG. 2A. In some embodiments, after performing operation S230, operation S240 is performed. In operation S240, the X-th delay time of the X-th switching element RX is calculated. In some embodiments, operation S240 is performed by the controller 150.

Figure 2C:
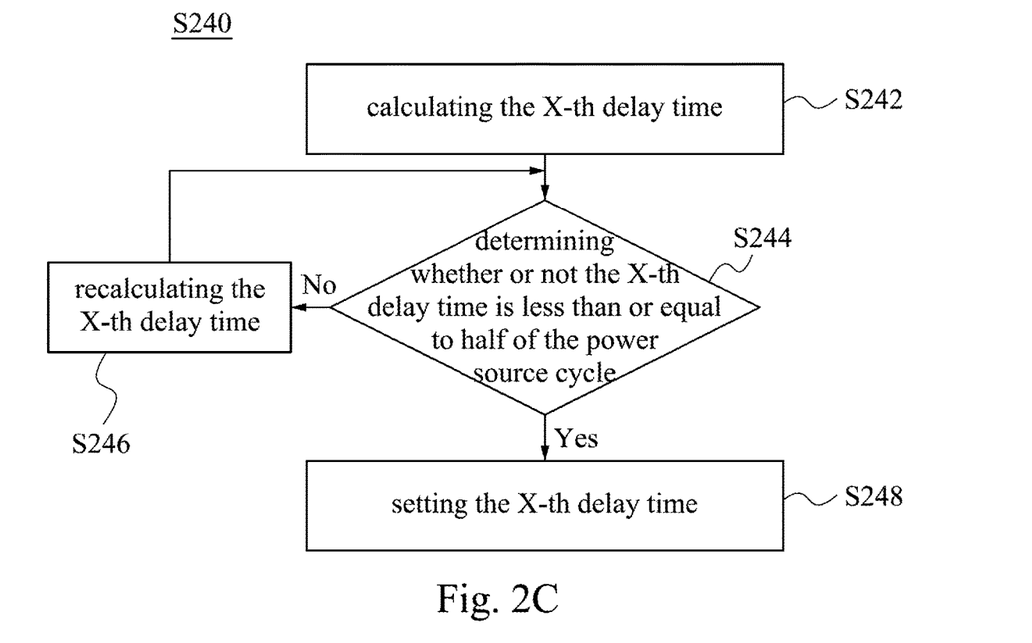
FIG. 2C is a flow chart illustrating another one of the operations in the intelligent charging method shown in FIG. 2A according to some embodiments of the present disclosure.

Reference is made to FIG. 2C. FIG. 2C is a flow chart illustrating another one of the operations in the method 200 of FIG. 2A according to some embodiments of the present disclosure. As shown in FIG. 2C, operation S240 includes operations S242 to S248.

Operation S242 is performed. In operation S242, the X-th delay time of the X-th switching element RX is calculated. The X-th delay time of the X-th switching element RX is calculated based on the phase time point and the X-th turned on time point of the X-th switching element RX. For example, the X-th delay time of the X-th switching element RX may be calculated according to the following relationship.

$$T\_DLY[X]=T\_CUR[X]-T\_ZC \qquad (2)$$

where T_DLY [X] is the X-th delay time of the X-th switching element RX, T_ZC is the phase time point, and T_CUR [X] is the X-th turned on time point of the X-th switching element RX. In some embodiments, operation S242 is performed by the controller 150.

Next, operation S244 is performed. In operation S244, the controller 150 determines whether the X-th delay time of the X-th switching element RX is less than or equal to half of the power source cycle.

When the controller 150 determines that the X-th delay time of the X-th switching element RX is not less than or equal to half of the power source cycle, operation S246 is performed. In operation S246, the X-th delay time of the X-th switching element RX is recalculated. In some embodiments, the X-th delay time of the X-th switching element RX is recalculated according to the power source cycle and the X-th delay time of the X-th switching element RX. For example, in operation S246, the calculation of the X-th delay time is based on the following relationship.

$$T\_DLY[X]=T\_DLY[X]-(0.5)\times T\_AC \qquad (3)$$

where T_DLY [X] is the X-th delay time of the X-th switching element RX, and T_AC is the power source cycle. In some embodiments, operation S246 is performed by the controller 150.

When the controller 150 determines that the X-th delay time of the X-th switching element RX is not greater than half of the power source cycle, operation S248 is performed. In operation S248, the X-th delay time of the X-th switching element RX is set. The X-th delay time of the X-th switching element RX is set according to the result calculated in operation S242 to operation S246. In some embodiments, operation S248 is performed by the controller 150.

Reference is made to FIG. 2A again. After performing operation S240, operation S250 is performed. In operation S250, it is determined whether the X-th turned on time point of the X-th switching element RX is within the allowable phase time interval. In some embodiments, operation S250 is performed by the controller 150.

In some embodiments, the controller 150 determines whether the X-th turned on time point of the X-th switching element RX is within the allowable phase time interval according to the phase time point. For example, the allowable phase time interval may be set to be within one twentieth of the power source cycle before and after the phase time point, and then whether the X-th turned on time point of the X-th switching element RX is within the allowable phase time interval is determined according to the set allowable phase time interval.

Reference is made to FIG. 2A. If it is determined at operation S250 that the X-th turned on time point of the X-th switching element RX is not within the allowable phase time period, operation S260 is performed. In operation S260, the X-th correction time of the X-th switching element RX is reset. In some embodiments, the X-th correction time of the X-th switching element RX is reset depending on the power source cycle and the X-th correction time of the X-th switching element RX. For example, in operation S250, the calculation of the X-th correction time of the X-th switching element RX is based on the following relationship.

$$T\_ADJ[X]=(0.5)\times T\_AC-T\_DLY[X] \tag{4}$$

where T_ADJ [X] is the X-th correction time, T_DLY [X] is the X-th delay time of the X-th switching element RX, and T_AC is the power source cycle. In some embodiments, operation S260 is performed by the controller 150.

Reference is made to FIG. 2A. After performing S260, the process returns to operation S220. Operations S220 to S250 are performed according to the X-th correction time of the reset X-th switching element RX.

Reference is made to FIG. 2A again. If it is determined at operation S250 that the X-th turned on time point of the X-th switching element RX is within the allowable phase time interval, operation S270 is performed. In operation S270, the controller 150 adjusts the index value according to X=X+1. Next, operation S280 is performed. In operation S280, the controller 150 determines whether X is equal to N. If it is determined that X is equal to N, it represents that the correction time of the control signal of all of the switching elements R1 to RN has been calculated. If it is determined that X is not equal to N, the process returns to operation S220 and then operations S220 to S250 are performed to set the correction time of the control signal of the next switching element RX.

Figure 3:
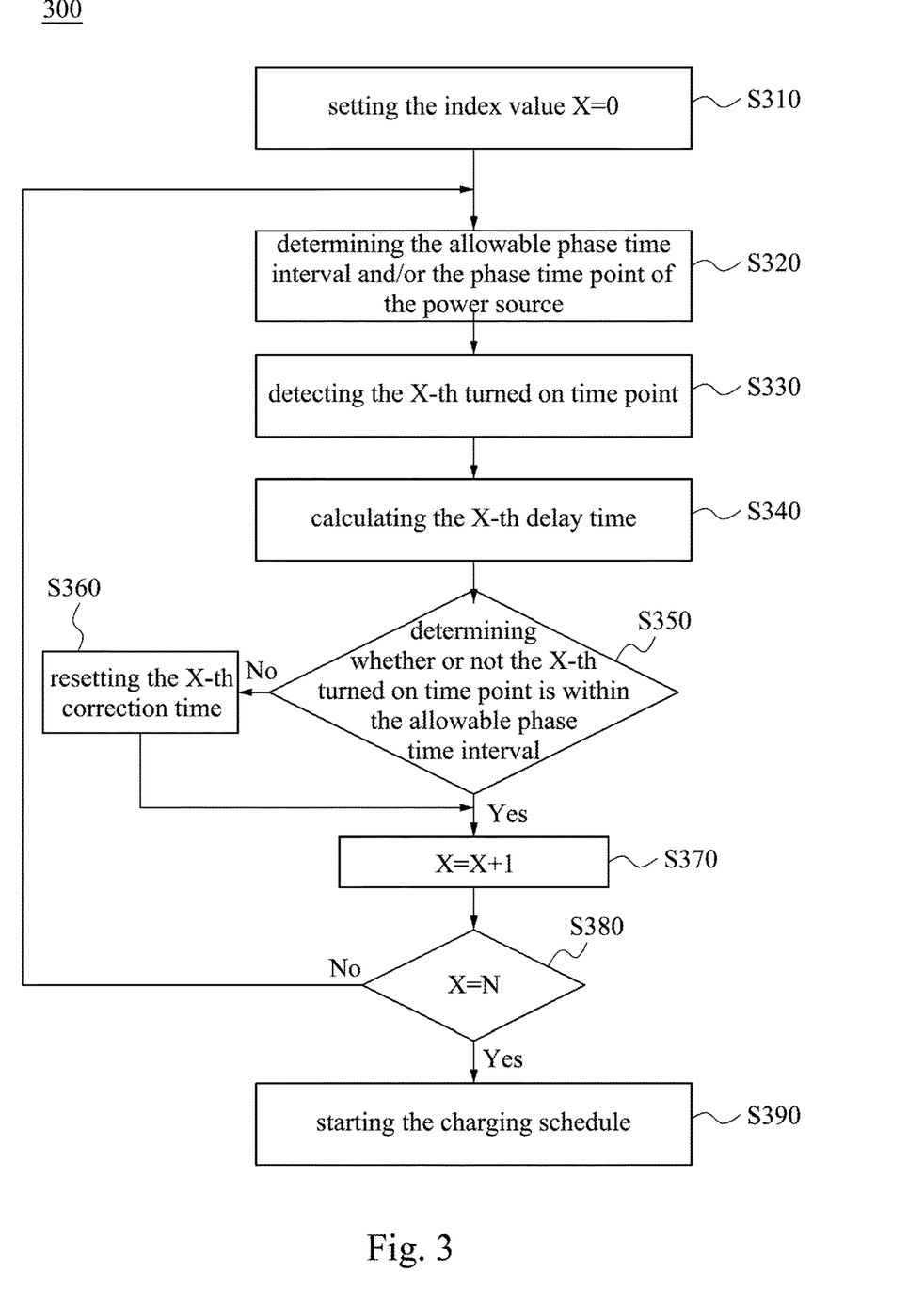
FIG. 3 is a schematic diagram illustrating an intelligent charging method according to other embodiments of the present disclosure.

Reference is made to FIG. 3. FIG. 3 is a schematic diagram illustrating an intelligent charging method 300 according to some other embodiments of the present disclosure. The intelligent charging method 300 includes operations S220 to S310.

In order to make the intelligent charging method 300 of this case easy to be understood, reference is made to FIG. 1B and FIG. 3 together. As illustrated in FIG. 3, in some embodiments, operation S310 is performed first. In operation S310, the index value X is set to 0, i.e. X=0. In some embodiments, operation S310 is performed by the controller 150.

Next, operations S320, S330, S340, and S350 are performed. Operation S320, S330, S340, and S350 of FIG. 3 are similar to operations S220, S230, S240, and S250 in FIG. 2A, and will not be described again herein.

Reference is made to FIG. 3 again. If it is determined at operation S350 that the X-th turned on time point of the X-th switching element RX is not within the allowable phase time interval, operation S360 is performed. Operation S360 is similar to operation S260 of FIG. 2A, and will not be described again herein.

As illustrated in FIG. 3, after performing S360, step S370 is performed. If it is determined at operation S350 that the X-th turned on time point of the X-th switching element RX is within the allowable phase time interval, operation S370 is also performed. Operation S370 is similar to operation S270 of FIG. 2A, and will not be described again herein.

Next, operation S380 is performed. As described above, operation S380 is performed to determine whether X is equal to N. If it is determined that X is not equal to N, the process returns to operation S320, and then operations S320 to S350 are performed to set the correction time of the control signal of the next switching element RX. In some embodiments, operation S380 is performed by the controller 150. Operation S380 is similar to operation S280 of FIG. 2A, and will not be described again herein.

Reference is made to FIG. 3 again. If it is determined in operation S380 that X is equal to N, it represents that the correction time of the control signal of all of the switching elements R1 to RN has been calculated. Then operation S390 is performed to start the charging schedule. In some embodiments, operation S390 is performed by the controller 150.

In some embodiments, the controller 150 calculates the control time points of the respective switching elements R1 to RN according to the respective control parameters of the respective switching elements R1 to RN during the charging schedule, and the controller 150 sends the respective control signal at the respective control time points of the respective switching elements R1 to RN to turn on the switching elements R1 to RN.

In some embodiments, the calculation of the X-th control time point of the X-th switching element may be calculated according to the following relationship.

$$T\_ON[X]=T\_ZC+T\_ADJ[X] \tag{5}$$

where T_ON[X] is the X-th control time point of the X-th switching element RX, T_ZC is the phase time point, and T_ADJ [X] is the X-th correction time of the X-th switching element RX. In addition, the X-th control time point of the X-th switching element RX is the time point at which the signal is transmitted to the X-th switching element RX.

In some embodiments, the switching elements R1 to RN may be turned on at the same time or may be turned on separately during the charging schedule.

In some embodiments, the phase detecting device 110 may be a device or circuit having a phase detection function or another equivalent function. In some embodiments, the current detecting device 130 may be a device or circuit having a current detection function or another equivalent function.

In some embodiments, the controller 150 may be a server, a circuit, a central processing unit, a microprocessor, or a processor having a function of storing, calculating, reading, receiving a signal or message, transmitting a signal or message, or another device with an equivalent function.

In some embodiments, the AC/DC converter 170 may be a circuit or other device having a function of converting current between an alternating current and a direct current or the like.

In some embodiment, the driving circuit D1 may be a circuit or other device having a function of sending and receiving information, controlling the switching element R1, or the like.

In some embodiments, the switching element R1 may be an element or device having a function of conducting or truncating a circuit, or the like.

According to the embodiment of the present disclosure, it is understood that the embodiment of the present disclosure is to provide an intelligent charging system and an intelligent charging method, and in particular, an intelligent charging system and an intelligent charging method for setting the control parameters, in order to effectively suppress the inrush current generated by the moment when the power supply is turned on. Furthermore, if the working time of the power switch varies due to aging or other reasons, the control parameters may also be corrected by correction learning, thereby correcting the control parameters to achieve the objective of inrush current suppression.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An intelligent charging system, comprising:
   a first switching element which is turned on or off based on a first control signal, wherein the first control signal comprises a first control parameter, and a time point at which the first control signal is transmitted is set according to the first control parameter;
   a phase detecting device configured to determine an allowable phase time interval of a phase of a power source;
   a current detecting device connected to the first switching element, wherein the current detecting device is configured to detect a first turned on time point when the first switching element is turned on; and
   a control circuitry connected to the phase detecting device and the current detecting device, wherein the control circuitry is configured to determine whether the first turned on time point is within the allowable phase time interval, and if the first turned on time point is not within the allowable phase time interval, the control circuitry recalculates the first control parameter of the first control signal.

2. The intelligent charging system of claim 1, wherein the control circuitry determines that a midpoint of the allowable phase time interval is a phase time point, and the control circuitry calculates a first delay time according to the first turned on time point and the phase time point, wherein the control circuitry determines whether the first delay time is greater than half of a power source cycle of the power source, and if the first delay time is greater than half of the power source cycle, the control circuitry recalculates the first delay time according to the power source cycle and the first delay time, and the control circuitry resets the first control parameter according to the first delay time and the power source cycle.

3. The intelligent charging system of claim 1, wherein the control circuitry determines that a midpoint of the allowable phase time interval is a phase time point, and the control circuitry sends the first control signal to the first switching element to turn off the first switching element, wherein the control circuitry calculates a first control time point according to the phase time point and a first correction time of the first control parameter, and the control circuitry sends the first control signal to the first switching element at the first control time point to turn on the first switching element.

4. The intelligent charging system of claim 1, wherein the control circuitry is configured to send the first control signal to the first switching element according to the first control parameter during a charging schedule, so as to turn on the first switching element to charge a mobile device connected to the first switching element.

5. The intelligent charging system of claim 1, further comprising:
   a first driver configured to receive the first control signal and to control the first switching element according to the first control signal.

6. The intelligent charging system of claim 5, further comprising:
   a second switching element which is turned on or off based on a second control signal; and
   a second driver configured to receive the second control signal and to control the second switching element based on the second control signal;
   wherein the current detecting device is connected to the second switching element and is configured to detect a second turned on time point when the second switching element is turned on;
   wherein the control circuitry is further configured to determine whether the second turned on time point is within the allowable phase time interval, and if the second turned on time point is not within the allowable phase time interval, the control circuitry resets a second control parameter of the second control signal.

7. An intelligent charging method, comprising:
   determining, by a phase detecting device, an allowable phase time interval of a phase of a power source;
   sending, by a control circuitry, a first control signal to a first switching element;
   detecting, by a current detecting device, a first turned on time point when the first switching element is turned on; and
   determining, by the control circuitry, whether the first turned on time point is within the allowable phase time interval, and if the first turned on time point is not within the allowable phase time interval, recalculating a first control parameter of the first control signal;
   wherein the first switching element turned on or off based on the first control signal, and a time point at which the first control signal is transmitted is set according to the first control parameter.

8. The intelligent charging method of claim 7, wherein resetting the first control parameter of the first control signal further comprises:
   determining that a midpoint of the allowable phase time interval is a phase time point;
   calculating a first delay time according to the first turned on time point and the phase time point;
   determining whether the first delay time is greater than half of a power source cycle of the power source;
   recalculating the first delay time according to the power source cycle and the first delay time if it is determined that the delay time is greater than half of the power source cycle; and resetting the first control parameter according to the first delay time and the power source cycle.

9. The intelligent charging method of claim 7, further comprising:

sending the first control signal to the first switching element to turn off the first switching element;

determining that a midpoint of the allowable phase time interval is a phase time point;

calculating a first control time point according to the phase time point and a first correction time of the first control parameter; and sending the first control signal to the switching element at the first control time point to turn on the first switching element.

10. The intelligent charging method of claim 7, further comprising:

sending a second control signal to a second switching element;

detecting a second conduction time point when the second switching element is turned on; and determining whether the second turned on time point is within the allowable phase time interval, and if the second turned on time point is not within the allowable phase time interval, resetting a second control parameter of the second control signal.

* * * * *